United States Patent [19]

Kawazoe

[11] 4,289,393
[45] Sep. 15, 1981

[54] CAMERA SUPPORTING DEVICE FOR LOW ANGLE OR CLOSE-UP PHOTOGRAPHY

[76] Inventor: Michio Kawazoe, 30-11, 5 chome, Higashi Narita Suginamiku, Tokyo, Japan

[21] Appl. No.: 96,392

[22] Filed: Nov. 21, 1979

[30] Foreign Application Priority Data

Apr. 24, 1979 [JP] Japan .............................. 54-55672[U]

[51] Int. Cl.³ ...................... G03B 17/00; F16M 11/26
[52] U.S. Cl. .................................... 354/293; 248/187
[58] Field of Search .......................... 354/81, 82, 293; 352/243; 362/3; D16/45; 248/169, 177, 183, 184, 187, 188.5, 178, 179, 188.7, 222.1, 316 E

[56] References Cited

U.S. PATENT DOCUMENTS

| | | | |
|---|---|---|---|
| D. 243,328 | 2/1977 | Kawazoe | D16/45 |
| 2,204,013 | 6/1940 | Gaidos | 248/183 |
| 2,323,473 | 7/1943 | Korling | 248/183 |
| 2,505,990 | 5/1950 | Pollock | 354/293 |
| 2,755,053 | 7/1956 | Sloane | 248/179 |
| 2,806,413 | 9/1957 | Jones | 248/188.5 |
| 3,586,278 | 6/1971 | Simons | 248/183 |
| 3,598,355 | 8/1971 | English | 248/178 |
| 3,614,047 | 10/1971 | Hitze | 248/178 |
| 3,952,982 | 4/1976 | Lewis | 354/293 |
| 4,029,246 | 6/1977 | Woodruff | 354/293 |
| 4,048,488 | 9/1977 | Kawazoe | 362/3 |
| 4,121,799 | 10/1978 | Kawazoe | 248/188.7 |
| 4,123,026 | 10/1978 | Kawazoe | 248/316 E |
| 4,134,662 | 1/1979 | Kawazoe | 354/293 |
| 4,234,149 | 11/1980 | Kawazoe | 248/184 |
| 4,240,129 | 12/1980 | Kawazoe | 248/222.1 |

OTHER PUBLICATIONS

Publication-Hercules Industrial Tripods Quick-Set Inc.

*Primary Examiner*—L. T. Hix
*Assistant Examiner*—Alan Mathews
*Attorney, Agent, or Firm*—Donald D. Mon

[57] ABSTRACT

A camera supporting device for low angle or close-up photography in which a supporting member having a stay is attached to the lower end of the elevator of a tripod. The supporting member provides a camera mount on which the camera is stably and accurately supported at a low position near the ground in its normal upright position.

9 Claims, 3 Drawing Figures

CAMERA SUPPORTING DEVICE FOR LOW ANGLE OR CLOSE-UP PHOTOGRAPHY

BACKGROUND OF THE INVENTION

This invention relates to a camera supporting device for low angle or close-up photography and more particularly for mounting a camera at the lower end of a tripod for adjusting the height of the camera freely by the up and down movement of the elevator.

Heretofore, in low angle or close-up photography, a camera is mounted at the lower end of the elevator of a tripod by means of a threaded screw. If a threaded screw is not provided at the lower end of the elevator, an elevator is inserted into the tripod in a reverse direction and a camera is attached to the elevator by the threaded screw which is normally used at the upper position. However, in said prior device, the camera becomes mounted upside down making operation of the camera difficult. To avoid this drawback, a special low angle tripod has been proposed, in which the elevator consists of a low angle elevator and an elevator connectable to said low angle elevator. The low angle elevator is supported by the three legs of the tripod through a stay. In low angle photography, the elevator is disconnected from the low angle elevator and the legs of the tripod are spread wider than for normal photography so as to be low and said stay is attached to the legs so as to limit spreading. However, the construction of the prior device is complicated and its operation is troublesome. Support of the camera is at the upper position. However, in said prior device, the camera becomes mounted upside down making operation of the camera difficult. To avoid this drawback, a special low angle tripod has been proposed, in which the elevator consists of a low angle elevator and an elevator connectable to said low angle elevator. The low angle elevator is supported by the three legs of the tripod through a stay. In low angle photography, the elevator is disconnected from the low angle elevator and the legs of the tripod are spread wider than for normal photography so as to be low and said stay is attached to the legs so as to limit spreading. However, the construction of the prior device is complicated and its operation is troublesome. Support of the camera is unstable. For said reasons, the prior device has not been widely utilized.

BRIEF SUMMARY OF THE INVENTION

The purpose of the present invention is to eliminate the drawbacks of prior devices described above and provide a camera supporting device for low angle or close-up photography in which the camera is stably supported at the low end of the elevator of a standard tripod having an easy to operate, simple construction which is low in cost. Moreover, it makes it possible to accurately position a camera at a lower position than with prior art devices.

Other objects and advantages of the invention will become apparent from the detailed description which follows.

BRIEF DESCRIPTION OF THE INVENTION

Figure 1:
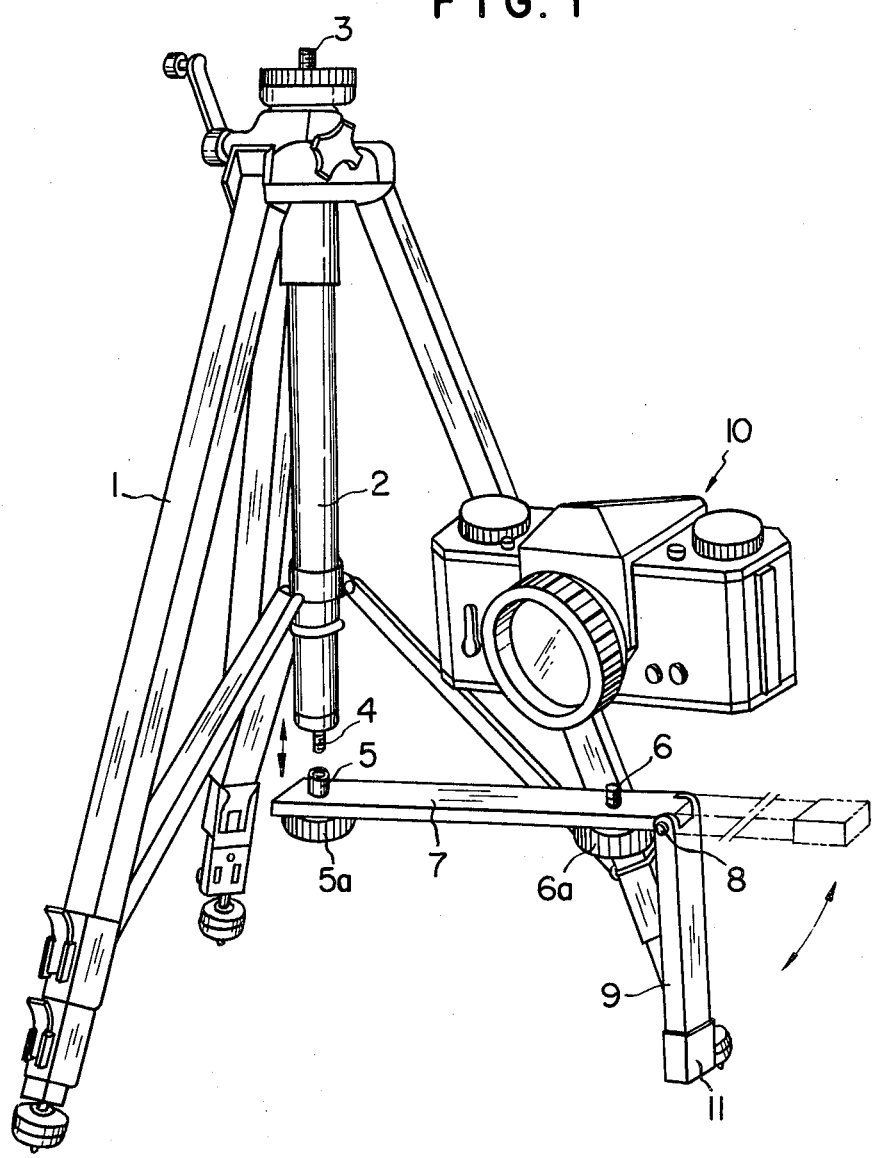
FIG. 1 is a perspective view illustrating an embodiment of the invention attached to the lower end of the elevator of a tripod.

Referring to FIG. 1 reference number 1 designates a tripod having an elevator 2 which is moved up or down by the operation of a handle. Threaded screws 3 and 4 are provided at the top and lower ends of the elevator 2 respectively, for mounting a pan head on the tripod.

Figure 2:
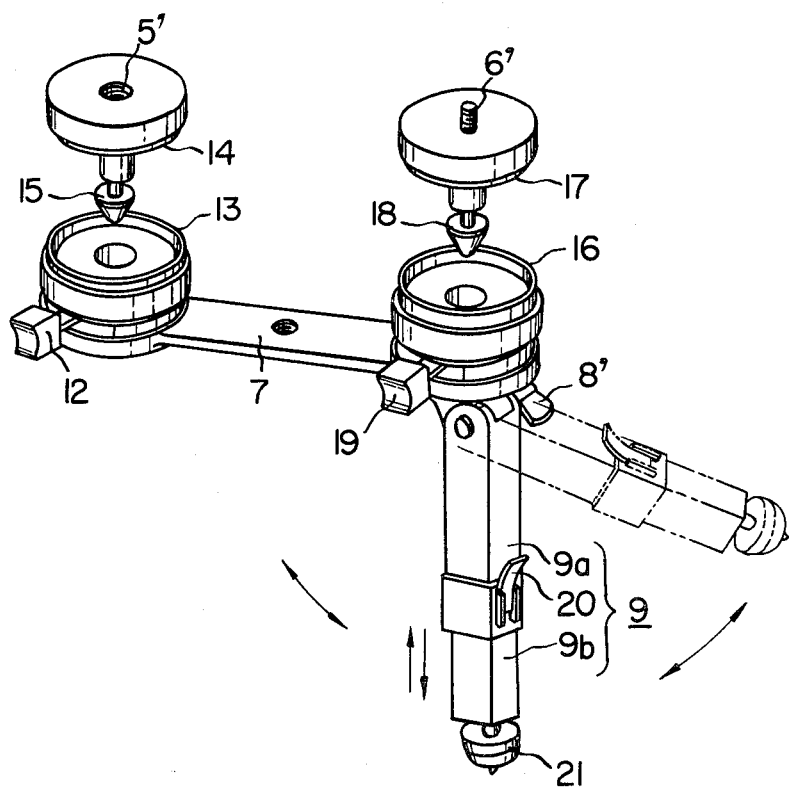
FIGS. 2, 3 are perspective views of another embodiments of the invention.

In this embodiment, a camera supporting member 7 has a screw 5 having a handle 5a at one end and a rotatable screw 6 having a handle 6a at its other end. The screw 5 has a female threaded hole to which said screw 4 attaches. The screw 6 is used for mounting a camera 10. At the end of said camera supporting member 7, one end of a stay 9 is pivotally attached by a pin 8 having a large rotating friction. A non-slip member 11 is provided at the lower end of said stay 9. A ferrule may be substituted for the non-slip member 11 as shown in FIG. 2. The length of the camera supporting member 7 (i.e., distance between screws 5 and 6) is such that the camera 10, when mounted, is beyond the confines of the tripod legs.

Operation of the embodiment of FIG. 1 is as follows. The support member is 7 is mounted on the tripod 1 by attaching screw 5 to the threaded screw or stud 4 at the lower end of the elevator 2 by rotating handle 5a. Elevator 2 may then be adjusted up or down and a stop or stay 9 rotated about pin 8 as indicated by the arrows according to the position of elevator 2. The stay 9 rests on the ground or surface supporting the tripod 1 stabilizing the position of the camera by providing additional firm support. Then screw 6 is attached to the female threaded hole of a camera 10 by rotating its handle 6a. Thus, the camera 10 is mounted at a low position (i.e., low angle position) to permit low angle photography. The height of the position of the camera 10 is determined by the relative position of the screw 4 at the lower end of elevator 2 and may be in the vicinity of ground level. When the height of the camera is very low, the stay 9 will be nearly parallel with support 7 as shown in FIG. 1 (near the dotted line) and its supporting force will be at a minimum. However, the weight of the camera 10 and supporting member 7 is amply supported by the tripod 1 through screw 4 on elevator 2 and the frictional resistance at the pin 8 is sufficient to provide some support. A butterfly nut or thumb screw (not shown) may be provided on the pin 8 for securing stay 9.

Other types of connections rather than threaded screws 4, 5 may be used at the connection between the lower end of elevator 2 and the end of the supporting member if desired. For example a notch and recess engagement device having a convex surface and concave surface may be used instead of screw attachments 4 and 5.

The advantages of this embodiment are summarized as follows:

1. A conventional tripod may be utilized because the camera is supported at the low end of the elevator and a special low angle tripod is not necessary.

2. The construction is simple and operation easy because it consists of a supporting member 7 having mounting screws at opposite pivoted ends and frictional stay at the end of said supporting member.

3. The camera is accurately and stably supported and may be very near the level of the ground for low angle photography.

4. The simple construction means is low in cost.

5. The tripod may be used as a conventional tripod when not being used for low angle photography by simply removing the supporting member.

6. It permits close-up photography by attaching a pan head at the low end of elevator 2 to threaded screw 4 or by adding a special threaded screw (not shown) at the bottom face of the screw handle 5a.

7. The appearance is good even with the supporting member 7 attached to the lower end of the elevator 2.

8. It is possible to carry the tripod with the stay 9 folded away against the supporting member 7.

FIG. 2 shows another embodiment of this invention. In this embodiment, a socket 13 having operating lever 12 is attached to the upper surface at one end of the supporting member 7. A plug 14 having female threaded hole 5' for attachment to said screw 4 at the lower end of the elevator 2 and a head 15, is provided for mating with socket 13. Another similar socket 16 having operating lever 19 is attached to the upper surface at the other end of the supporting member 7. A second plug 17 is provided having a threaded bolt 6' for mounting a camera 10 and a head 18 for mating with socket 16. When the heads 15, 18 are inserted into the holes of sockets 13, 16, respectively, they automatically engage with the sockets and are secured in a conventional manner by rotating the operating levers 12, 19, respectively. The heads 15, 18, respectively, are released by pushing levers 12, 19 toward the center of the sockets 13, 16. The stay 9 consists of part 9a and part 9b that are in telescopic relation to each other. By pushing the tongue 20, a lock between part 9a and 9b is released and they can telescopically adjust the length of the stay 9. A ferrule is provided at the lower end of the part 9b. The part 9a is pivotally mounted on the end of the supporting member 7 by a butterfly screw 8' for locking the stay 9 at a desired angle.

The operation of the embodiment of FIG. 2 is as follows:

The female threaded hole 5' is attached to the screw 4 on the lower end of the elevator 2 and socket 13 is attached to the plug 14. The height of the elevator 2 is then adjusted up or down and the length of the stay 9 also adjusted by pushing the tongue 20 to release parts 9a and 9b for adjustment according to the height of the lower end of the elevator 2. The camera 10 is then attached to the threaded bolt 6' and plug 17 inserted into socket 16. Thus the camera 10 is set at a low position and low angle photography may be performed. The connection between the plugs 14, 17 and the socket 13, 16, respectively is released in a conventional manner by the respective pushing lever 12, 19 toward the center and rotating them in a releasing direction.

It is clear that the discussed above advantages with respect to the first embodiment are attained with this embodiment. Further in this embodiment, the camera 10 is more stably supported by the adjustable stay 9 and securing butterfly screw 8'. It is also possible to easily carry the tripod by folding the stay 9 away against supporting member 7 and attach a pan head at the lower end of the elevator 2 for close-up photography.

Figure 3:
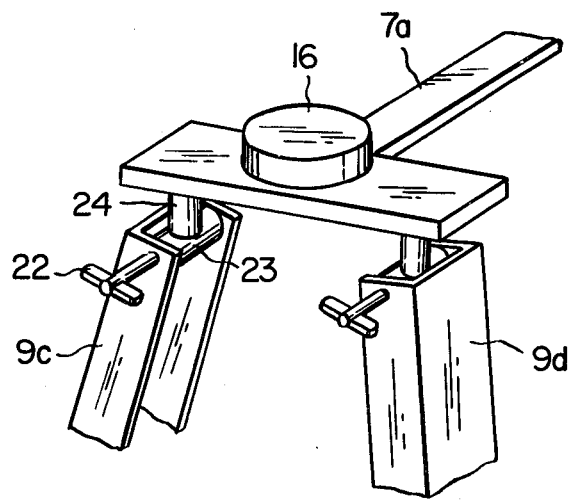

FIG. 3 shows another embodiment of this invention in which a pair of stays 9c, 9d are pivotally mounted on the both sides of the end of the supporting member 7a by securing screw 22,22 and shaft 23,23 which is rotatably connected to said member 7a by vertical shaft 24,24 for more stable mounting of a camera.

I claim:

1. A camera supporting device for low angle or close-up photography comprising; a tripod having a plurality of foldable legs and an elevator; a camera supporting member; means for attaching one end of said camera supporting member to the lower end of said elevator comprising a threaded screw on the lower end of said tripod elevator and a lever operated socket on one end of said supporting member having a releasable mating plug with a female threaded hole; said camera supporting member extending horizontally beyond the legs of the tripod when the tripod legs are unfolded; means for attaching a camera to the other end of said supporting member; and an adjustable stay pivotally attached to the other end of said camera supporting member, said stay adapted to be adjusted to contact the surface on which the tripod is resting thereby providing a supporting force for the camera supporting member.

2. A camera mount according to claim 1 wherein the means for attaching camera comprises a threaded screw on the other end of said support member.

3. A camera mount according to claim 2 wherein said means for attaching said camera comprises a lever operated socket on the other end of said supporting member having a releasable mating plug; said threaded screw being on said plug.

4. A camera mount according to claim 1 wherein said stay is attached to the other end of said supporting member with a pin which applies a large frictional force.

5. A camera mount according to claim 4 including means for locking said stay in a preset position by increasing the force on said pin.

6. A camera mount according to claim 5 wherein said stay is comprised of two telescopically adjustable members.

7. A camera mount according to claim 1 wherein said stay is comprised of two telescopically adjustable members.

8. A camera mount according to claim 4 wherein said stay is comprised of two telescopically adjustable members.

9. A camera supporting device for low angle or close up photography according to claim 1 wherein said stay comprises a pair of stays pivotally mounted on either side of the other end of said supporting member.

* * * * *